(12) United States Patent
Sade

(10) Patent No.: US 9,057,546 B2
(45) Date of Patent: Jun. 16, 2015

(54) SOLAR TRACKER

(76) Inventor: Rovshan Sade, Raleigh, NC (US)

( * ) Notice: Subject to any disclaimer, the term of this patent is extended or adjusted under 35 U.S.C. 154(b) by 910 days.

(21) Appl. No.: 12/830,907

(22) Filed: Jul. 6, 2010

(65) Prior Publication Data

US 2012/0006317 A1 Jan. 12, 2012

(51) Int. Cl.
F24J 2/54 (2006.01)
(52) U.S. Cl.
CPC .............. F24J 2/5413 (2013.01); Y02B 10/20 (2013.01); Y02E 10/47 (2013.01)
(58) Field of Classification Search
USPC ........... 126/569, 600; 136/245; 248/461, 505, 248/150, 165, 688, 685, 136
See application file for complete search history.

(56) References Cited

U.S. PATENT DOCUMENTS

| | | | | |
|---|---|---|---|---|
| 2,061,336 A * | 11/1936 | Stuart | | 126/25 R |
| 2,859,745 A * | 11/1958 | Von Brudersdorff | | 126/681 |
| 3,106,201 A * | 10/1963 | Steinberg | | 126/682 |
| 4,063,963 A | 12/1977 | Bond, Jr. | | |
| 4,178,913 A * | 12/1979 | Hutchison | | 126/601 |
| 4,203,427 A * | 5/1980 | Way, Jr. | | 126/681 |
| 4,226,256 A | 10/1980 | Hawley | | |
| 4,644,933 A * | 2/1987 | Gregory | | 126/601 |
| 5,632,480 A | 5/1997 | Davis et al. | | |
| 5,633,891 A * | 5/1997 | Rebec et al. | | 375/219 |
| 5,916,047 A | 6/1999 | Schickert et al. | | |
| 6,105,316 A | 8/2000 | Bottger | | |
| 6,494,445 B1 * | 12/2002 | Bellis, Jr. | | 269/71 |
| 6,563,040 B2 * | 5/2003 | Hayden et al. | | 136/244 |
| 6,616,278 B2 * | 9/2003 | Gohno et al. | | 351/245 |
| 7,884,279 B2 * | 2/2011 | Dold et al. | | 136/246 |
| 7,898,212 B2 * | 3/2011 | Benn et al. | | 320/101 |
| 8,492,645 B1 * | 7/2013 | Strahm | | 136/244 |
| 8,707,949 B2 * | 4/2014 | Hoffman | | 126/600 |
| 2004/0195487 A1 * | 10/2004 | Harbaugh | | 248/519 |
| 2009/0134291 A1 * | 5/2009 | Meier et al. | | 248/222.14 |
| 2009/0293861 A1 * | 12/2009 | Taylor et al. | | 126/600 |
| 2010/0071684 A1 * | 3/2010 | Cowan et al. | | 126/605 |
| 2010/0313878 A1 * | 12/2010 | Essig et al. | | 126/681 |

* cited by examiner

Primary Examiner — Avinash Savani
(74) Attorney, Agent, or Firm — Coats and Bennett, PLLC

(57) ABSTRACT

A free-standing solar tracker comprises a base, a support frame, a panel assembly comprising one or more solar panels, and an actuator to rotate the panel assembly to track the movement of the sun. The solar tracker is designed to be free-standing and requires no foundation. When the solar tracker is deployed, the base forms a pan to contain a ballast material for holding the base in place. The base of the solar tracker is designed to serve as a "suitcase" to contain most of the components of the solar tracker, making it easier to transport the solar tracker 10 to a location where the solar tracker is installed.

6 Claims, 9 Drawing Sheets

SOLAR TRACKER

BACKGROUND

The present invention relates generally to solar panels for generating solar energy and, more particularly, to a free-standing solar tracker with a rotating panel assembly to track the movement of the sun during the day.

Photovoltaic panels, or solar panels, have been used for a long time in commercial and residential applications. A solar panel typically comprises a plurality of photovoltaic cells, also known as solar cells, that convert sunlight into electricity. In most commercial or residential applications, a large array of solar panels is needed to generate enough energy to have any practical effect. Thus, the use of solar panels requires a relatively large amount of open space exposed to direct sunlight. Most often, solar panels are mounted on the roofs of homes and buildings. In most installations, the solar panels are mounted in a fixed position to maximize the exposure when the sun is at its peak.

Conventional solar systems have not gained widespread acceptance for a number of reasons, including the cost of the solar systems, the availability of adequate space, and aesthetic reasons. Conventional solar systems typically cost more than other available energy sources. The added expense of solar systems is an impediment to adoption of solar systems. Also, many people who are willing to pay the extra cost of a solar system may not be able to do so because they lack adequate space exposed to the sun. Others may consider solar panels mounted on the roofs of homes to be aesthetically unappealing. Concerns over the aesthetics of the solar panels are another impediment to adoption of solar systems.

Therefore, there is a continuing need for a solar system that is relatively inexpensive, that can be deployed in a relatively small area, and overcome concerns regarding aesthetics of the solar panels.

SUMMARY

The present invention provides a free-standing solar tracker that can be used for both residential and commercial applications. The solar tracker comprises a base, a support frame, a panel assembly including one or more solar panels, and an actuator to rotate the solar panel to track the movement of the sun. The solar tracker is designed to be free-standing and requires no foundation. When the solar tracker is deployed, the base forms a pan to contain a ballast material for holding the base in place. Thus, the solar tracker can be easily moved to a site with adequate exposure to the sun.

The solar tracker is designed to be relatively inexpensive to build and operate. Additionally, the ability to track the movement of the sun significantly increases the output of the solar panel assembly, thus increasing the user's return on the investment in the solar system. The free-standing support enables the solar tracker to be deployed in any location with adequate exposure. Also, the ability to deploy the solar tracker in any desired location means that the solar tracker can be deployed in locations that will not detract from the appearance of the owner's home or building.

DETAILED DESCRIPTION

Figure 1:
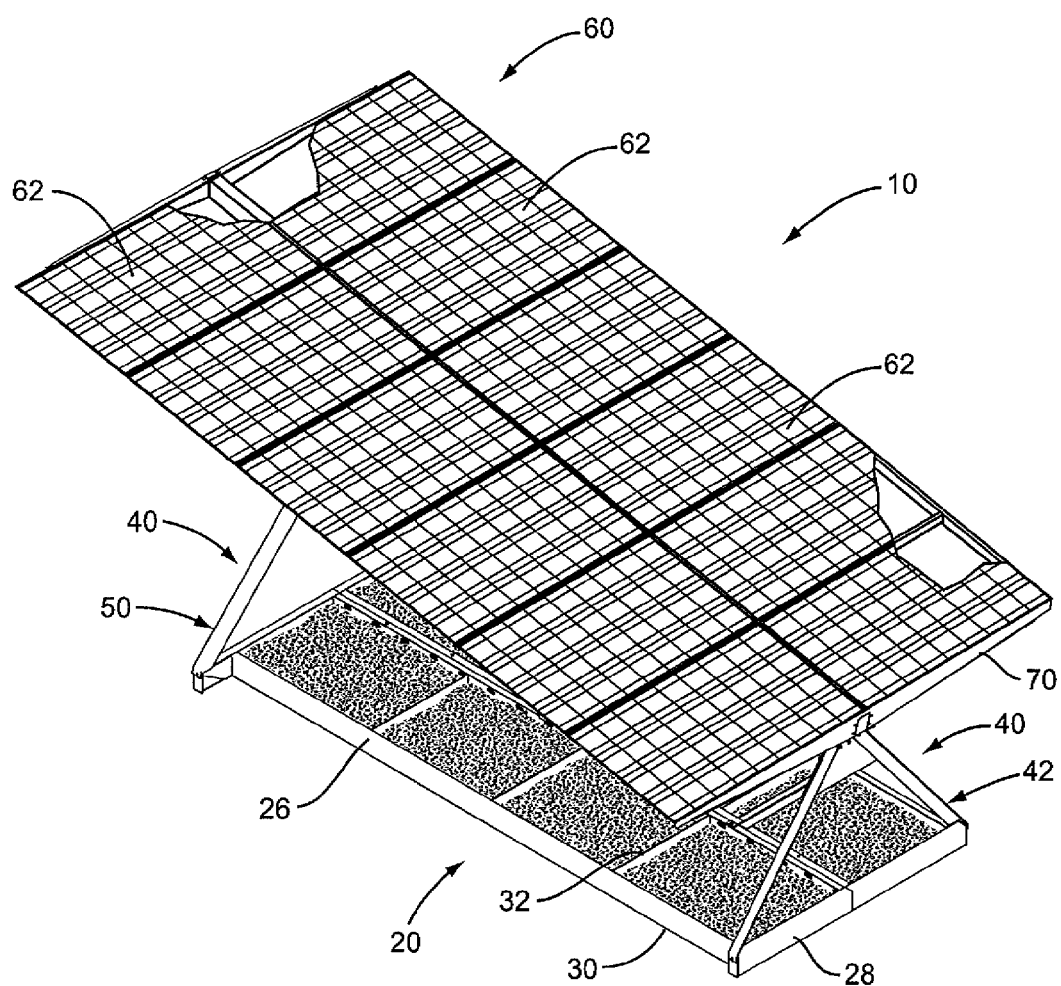
FIG. 1 is perspective views of a solar tracker according to a first exemplary embodiment of the invention with its solar panel in a first rotational position.
Figure 2:
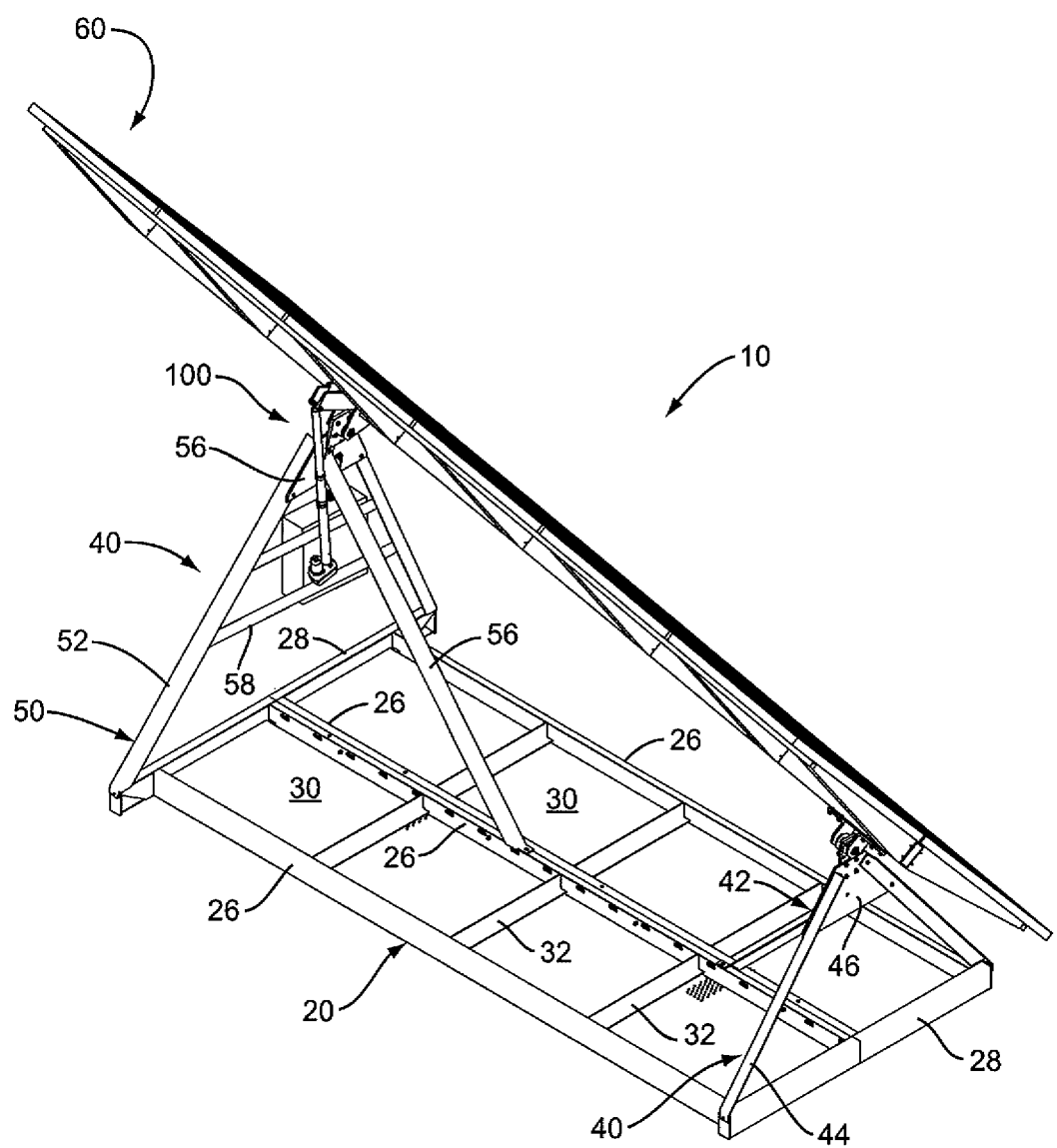
FIG. 2 is perspective views of a solar tracker according to the first exemplary embodiment of the invention with its solar panel in a second rotational position.
Figure 3:
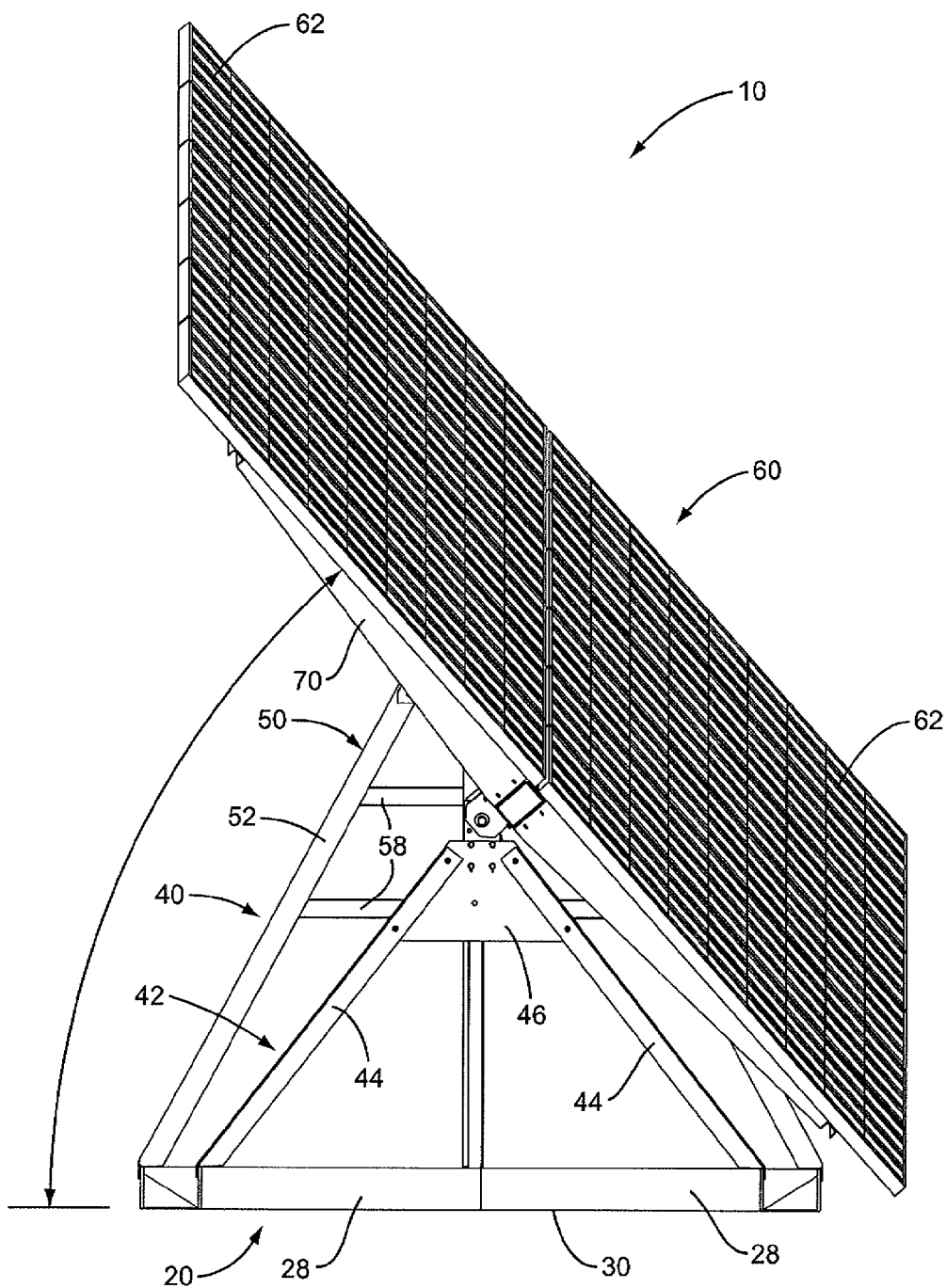
FIG. 3 is a front elevation of the solar tracker.
Figure 4:
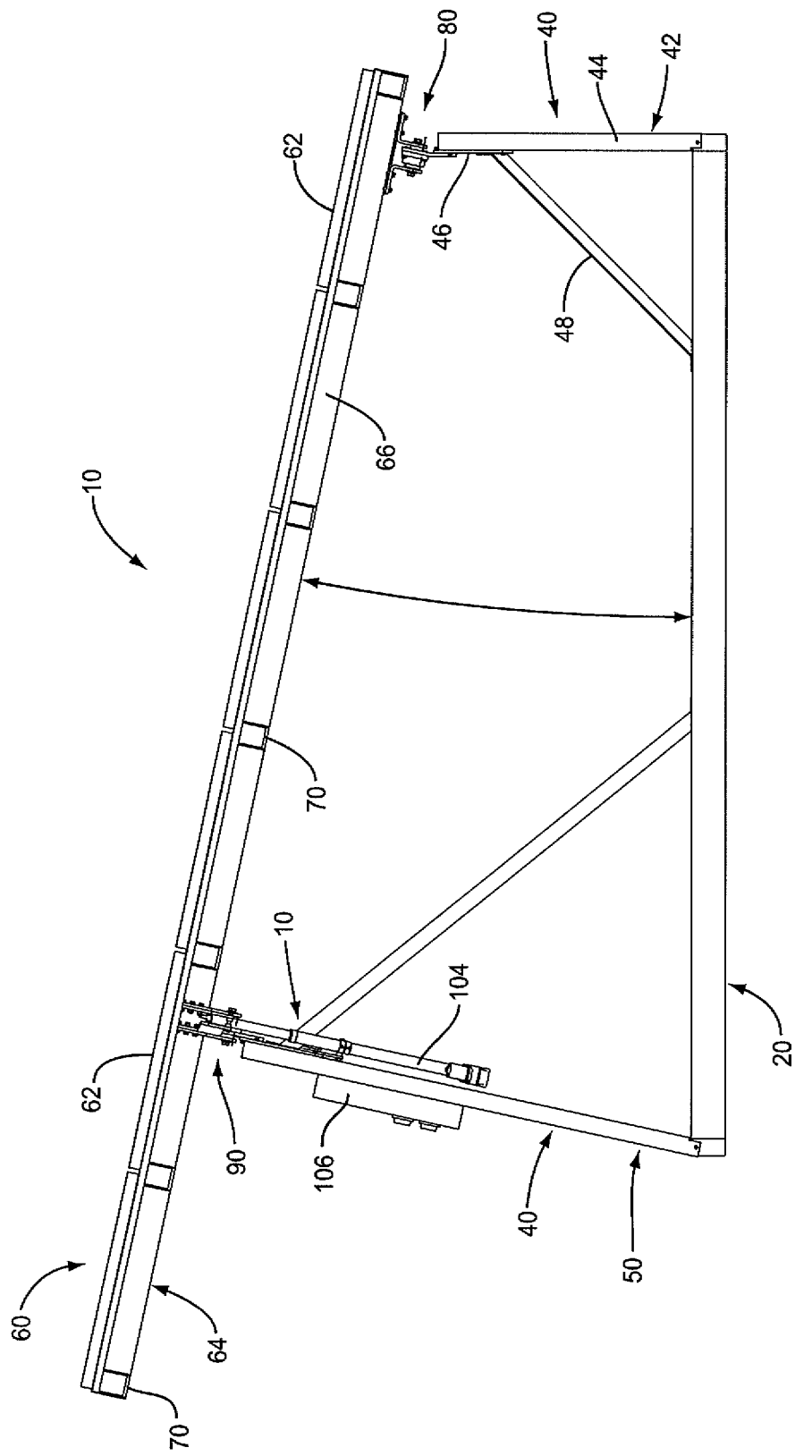
FIG. 4 is a side elevation of the solar tracker.

Referring now to the drawings, a solar tracker 10 according to the present invention is shown. The solar tracker 10 generally comprises a base 20, support frame 40, panel assembly 60, and actuator assembly 90 for rotating the panel assembly 60 to follow the azimuth of the sun as it moves across the sky. The solar tracker 10 is designed to be free-standing and requires no foundation. Thus, the solar tracker 10 can be easily moved between sites. The base 20 of the solar tracker is designed to serve as a "suitcase" to contain most of the components of the solar tracker 10, making it easier to transport the solar tracker 10 to a location where the solar tracker is installed.

The base 12 of the solar tracker 10 is formed in two sections 22 that are connected to one another by a hinge 24. The base sections 22 are movable between an open or deployed position (FIGS. 1-5) and a closed or storage position (FIG. 56). Each section 22 comprises a pair of side members 26 and a pair of end members 28 forming a generally-rectangular frame. The side members and end members may be constructed of a metal tubing, metal channel, or metal beam. A bottom sheet 30 made of a sheet metal is fixedly attached to the frame such as by welding to form an open pan in the deployed position. Separators 32 are spaced longitudinally between the end members 28 and extend between the side members 26. The separators 32 may be inserted into tracks or channels (not shown) in the side members 26 so that the separators can be removed. In a preferred embodiment, the separators 32 are formed of a sheet metal and extend approximately two-thirds the height of the side members 26. The separators 32 prevent the ballast material from shifting and help maintain the ballast material evenly distributed over the pan formed by the base 20. In use, the base sections 22 are unfolded so that they lie side-by-side. The base sections 22 can then be bolted together in the open position or may be held together by the hinge 24.

The support frame 40 mounts to the base 20. The support frame 40 comprises front frame 42 and a rear frame 52. The front frame 42 comprises a pair of legs 44, a gusset plate 46, and a strut 50, which may be made of metal and removably connected together by bolts and nuts, or other suitable fasteners. The legs 44 may be made of rigid material, such as a metal angle. The legs 44 extend upwardly at an angle from the one end of the base 20. The lower ends of the legs 44 are bolted or otherwise secured to respective end members 28 of the base 20. The upper end of the legs 44 are connected by a gusset plate 46, which may be made of a metal plate. The gusset plate 46 provides rigidity to the frame 42, as well as provides a surface for mounting the panel assembly 60 as hereinafter described. Strut 50 is made of a rigid material, such as a metal angle, and provides lateral stability for the front frame 42. The strut 50 is connected at the lower end to the side members 26 of the base 20, and at the upper end to the gusset plate 46 of the frame 42.

The rear frame 50 includes a pair of legs 52, gusset plate 52, and strut 56, which may be made of metal and removably connected together by bolts and nuts, or other suitable fasteners. The legs 52 extend upwardly at an angle from respective end members 28 of the base 20. The lower ends of the legs 52 are bolted or otherwise secured to the end members 28, while the upper ends of the legs 52 are connected by the gusset plate 54, which may be made of a metal plate. Strut 56 extends between the base 20 and gusset plate 54 to provide lateral stability to the rear frame 52. It may be noted that the rear frame 50 is tilted at a slight angle relative to the base 20, whereas the front frame 42 is perpendicular to the base 20. The exact orientation of the frames 42, 50, however, is not material. Depending on the size of the frame 42, reinforcing members 58 may be provided to interconnect the legs 52 at spaced locations.

The panel assembly 60 comprises a plurality of solar panels 62 and a panel support frame 64 to support the solar panels. The panel support frame 64 comprises a central spine 66, a pair of laterally-spaced side members 68, and a plurality of longitudinally-spaced panel carriers 70, which can be removably connected by bolts and nuts, or other fasteners. The panel carriers 70 include an inner end and an outer end. The inner end connects to the spine 66 and while the side member 78 connect to the outer ends of the panel carriers 70. The spine 66 in the exemplary embodiment is made from a metal tube, while the side members 68 and panel carriers are made of a metal channel. The panel carriers 70 taper from the inner end to the outer end. The side members 68 are spaced from the spine 66 so that the inner ends of the solar panels rest on a top surface of the spine 66, while the outer ends of the solar panels rest on a top surface of the side members 68. The panel carriers 70 are longitudinally-spaced so that the side edges of the solar panels 62 rest on the top surfaces of respective wing member 70. The solar panel 62 can be removably secured to the panel support frame 64 by bolts, screws, clamps, or other mechanical fastening devices.

Figure 5:
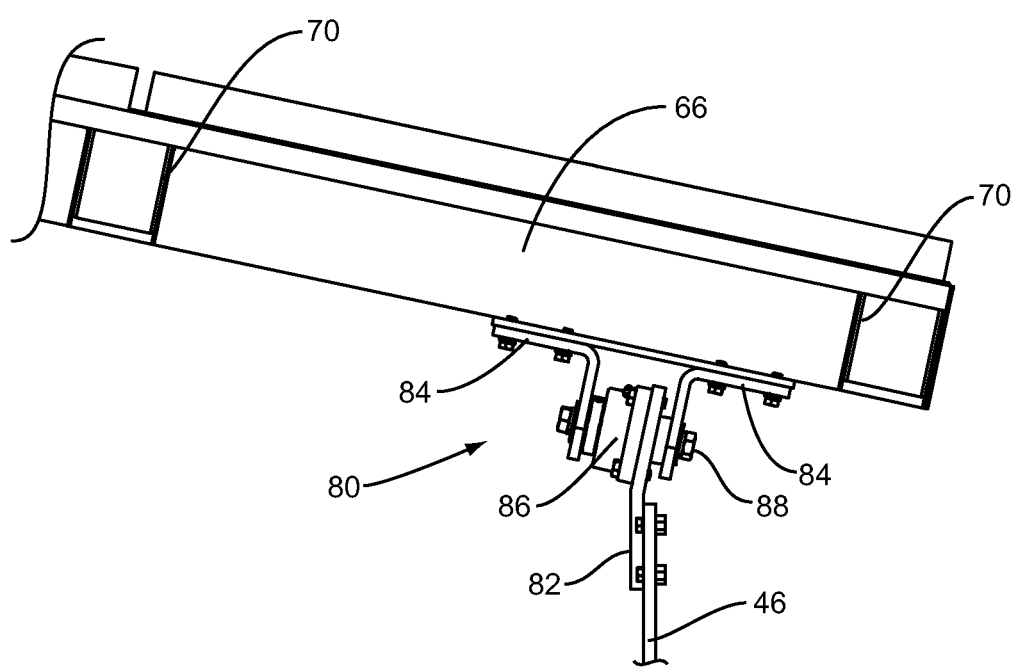
FIGS. 5 and 6 illustrate the mounting of the panel assembly to the support frame.

The panel assembly 60 is rotatably mounted to the support frame 40 so as to rotate about a single, inclined axis. FIG. 5 shows a first mounting assembly 80 for securing the lower end of the panel assembly 60 to the front support frame 42. The first mounting assembly 80 comprises a connecting plate 82, L-shaped mounting brackets 84, bearing 86, and a pivot member 88. The connecting plate 82 is bolted, welded, or otherwise secured to the gusset plate 46 of the front frame 42. The connecting plate 82 is bent at a slight angle to provide the desired tilt for the rotational axis of the panel assembly 60. Mounting brackets 84 are bolted or welded to the spine 66 of the panel support frame 64. The upper end of connecting plate 82 and bearing 66 are disposed between the brackets 86. Pivot member 88, such as a bolt, passes through the mounting brackets 84, connecting plate 82, and bearing 86, and is secured by a conventional nut threaded onto the end of the pivot member 88.

Figure 6:
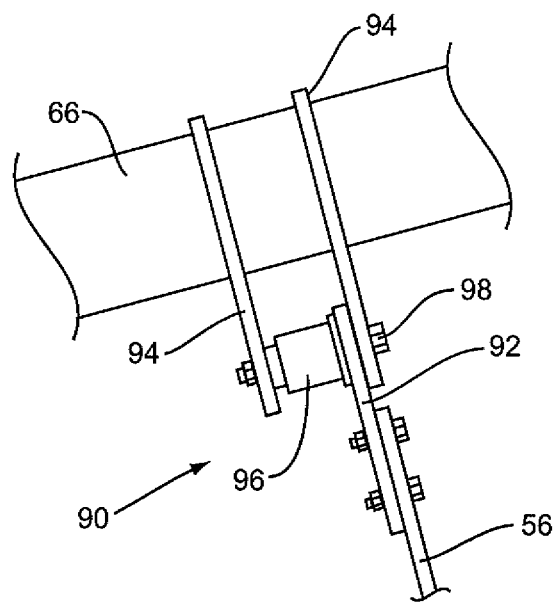
Figure 7:
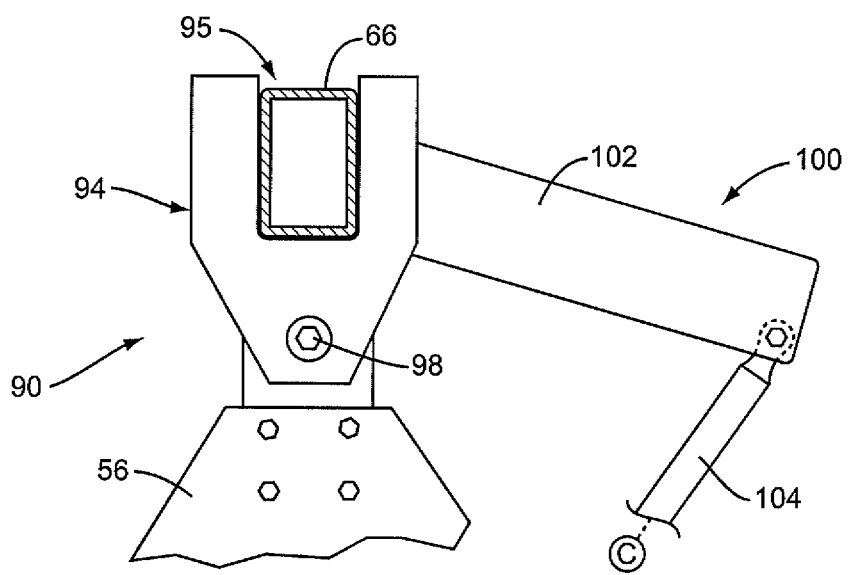
FIG. 7 illustrates the actuator assembly and mounting of the panel assembly to the support frame.

FIGS. 6 and 7 shows a second mounting assembly 90 for mounting the upper end of the panel support frame 64 to the rear support frame 50. The second mounting assembly 90 comprises a connecting plate 92, a pair of mounting forks 94, a bearing 96, and a pivot member 98. Connecting plate 92 is secured by bolts or other mechanical fasteners to the gusset plate 56 of the rear support frame 50. The mounting forks 94 include a slot 95 to receive the spine 66 of the panel support frame 64. The mounting forks 94 may be permanently fixed to the spine 66 by welding. Bearing 96 is disposed between the lower end of the mounting forks 94. Pivot member 98 extends through the mounting forks 94, upper end of connecting plate 92, and bearing 96, and is secured in place by a nut threaded onto the end of the pivot member 98.

Pivot member 88 on the first mounting assembly 80 and pivot member 98 on the second mounting assembly 90 are co-axially aligned along the axis and rotation of the panel assembly 60. The rotational axis inclines upwardly from front to rear in a plane perpendicular to the base 20. The rotational axis is aligned when deployed so that the plane of the rotational axis aligns with the sun at the highest altitude. Thus, the panel assembly 60 can rotate to track the path of the sun as the sun travels across the sky during the day.

Actuator assembly 100, shown in FIG. 7, comprises a pivot arm 102, fluid cylinder 102, and control unit 106. Pivot arm 102 is connected at one end to the spine 66 of the panel support frame 64. Pivot arm 102 extends outward from the spine 66. Fluid cylinder 104 is connected at one end to the pivot arm 102 and the opposite end to the front Frame. Control unit 106 is mounted to the front Frame and controls operation of the fluid cylinder 104. The extension of the fluid cylinder 104 rotates the panel assembly 60 in a first direction, while retraction of the fluid cylinder 104 rotates the panel assembly 60 in the opposite direction. The control unit 106 preferably includes a processor and associated memory for controlling the rotation of the panel assembly 60. The control unit 106 may store ephemeras data in memory that gives the position of the sun in the sky at different times of the day. Alternatively, the position of the sun in the sky at different times of day may be calculated based on formulas that model the sun's movement. As the azimuth of the sun changes, the control unit 106 rotates the panel assembly 60 to minimize as much as possible the angle of incidence of the sun rays on the solar panels 62. It is noted that the panel assembly 60 rotates about a single axis that follows the azimuth of the sun. Those skilled in the art will appreciate that it is also possible to change the angle of inclination of the solar panels to track changes in the altitude of the sun.

Figure 8:
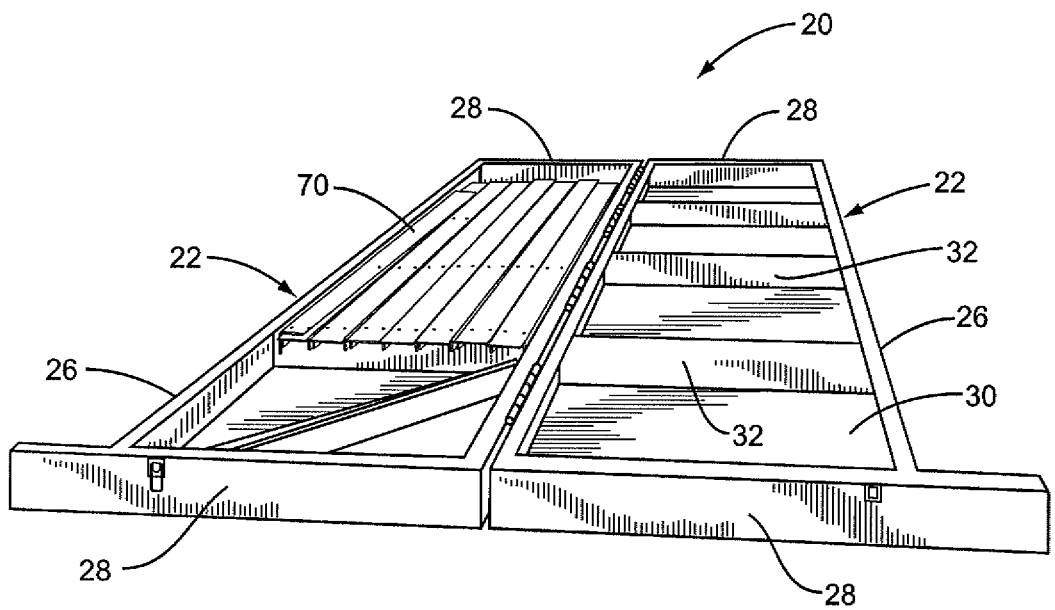
FIG. 8 illustrates the base of the solar tracker with disassembled components of a support frame and panel assembly stored inside the base.
Figure 9:
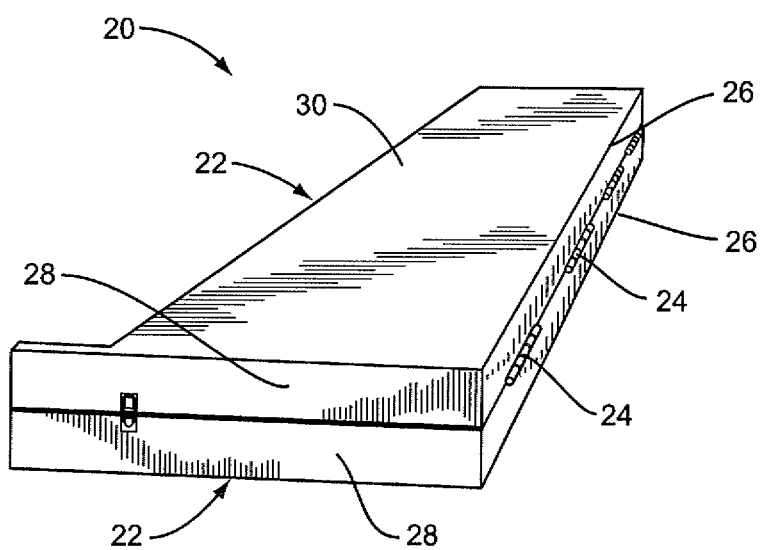
FIG. 9 illustrates the base of the solar tracker closed to contain the disassembled components of a support frame and panel assembly.

As previously noted, the solar tracker 10 is designed so that most of the components can be disassembled and packaged in the base 20. FIG. 8 shows the base 20 with the base sections 22 folded open. FIG. 9 shows the panel carriers 70 stored in one of the base sections 22. Components of the support frame 40 may, likewise, be disposed in one of the base sections. Essentially all of the components, with the exception of the spine 66 and solar panels 62, will fit inside the base sections 22. The base sections 22 can then be folded to a closed position as shown in FIG. 9 to form a suitcase with a compartment containing most of the solar tracker components.

Figure 10:
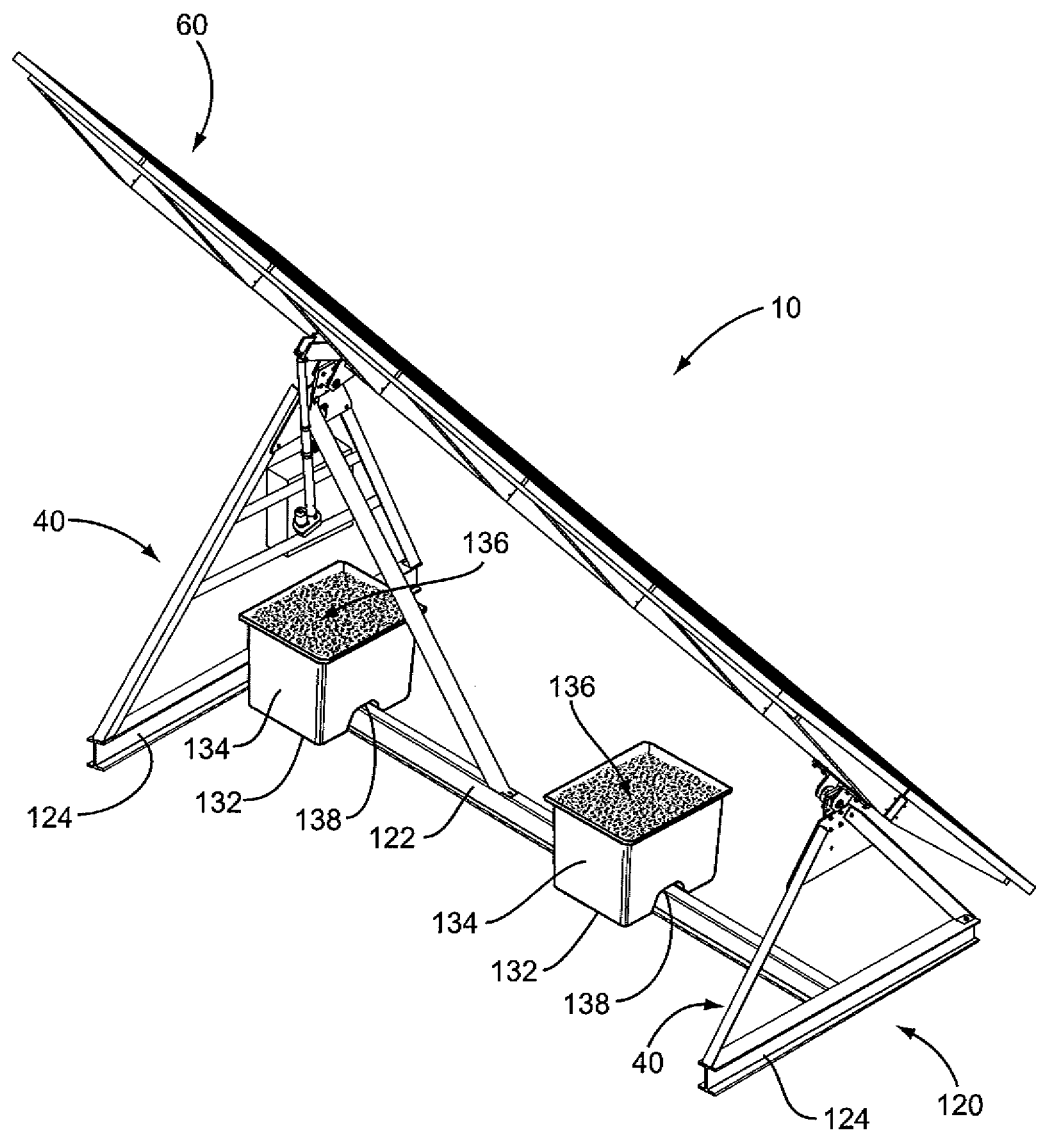
FIG. 10 illustrates a second embodiment of the solar tracker.

FIG. 10 shows a second embodiment of the solar tracker. This embodiment is the same as the first embodiment except for the construction of the base, which is designated by reference number 120 in this embodiment. The base 120 comprises an I-shaped frame having center beam 122 and a pair of end beam 124. The end beams 124 may be secured to the center beam 122 by bolting, welding, or other suitable means. In the illustrated embodiment, the center beam 122 and end beams are metal I-beams. Those skilled in the art will appreciate that the center beam 122 and end beams 124 may also comprise metal channels, metal tubes, or other structural members.

The base 120 is designed to lie on a flat surface. The base 120 is held in place by specially-designed ballast containers 130 that contain a ballast material, such as sand, gravel, water, etc. In the exemplary embodiment shown in FIG. 6, the ballast containers 130 comprise open containers having a bottom 132, side walls 134, and open top 136. A channel 138 is formed in the bottom 132 of the ballast containers 130 so that the center beam 122 of the base 120 can pass through the ballast containers 130 as shown in FIG. 10. Thus, the ballast containers 130 effectively straddle the center beam 122 of the base 120. Once the ballast containers 130 are placed on the center beam 122 as shown in FIG. 100, the ballast containers 130 can be filled with a ballast material (e.g., gravel, sand, water, etc) to hold the base 120 in place.

While the embodiment shown in FIG. 6 contains the ballast material in open ballast containers 130, those skilled in the art will appreciate that closed ballast containers 130 could also be used. For example, the ballast container 130 may comprise a closed container with a fill hole for filling the ballast container 130 with water or other fluid. The ballast container 130 could be formed with handle or other features for carrying the ballast containers 130. The ballast containers 130 may also have features for stacking and/or nesting the ballast containers 130.

Figure 11:
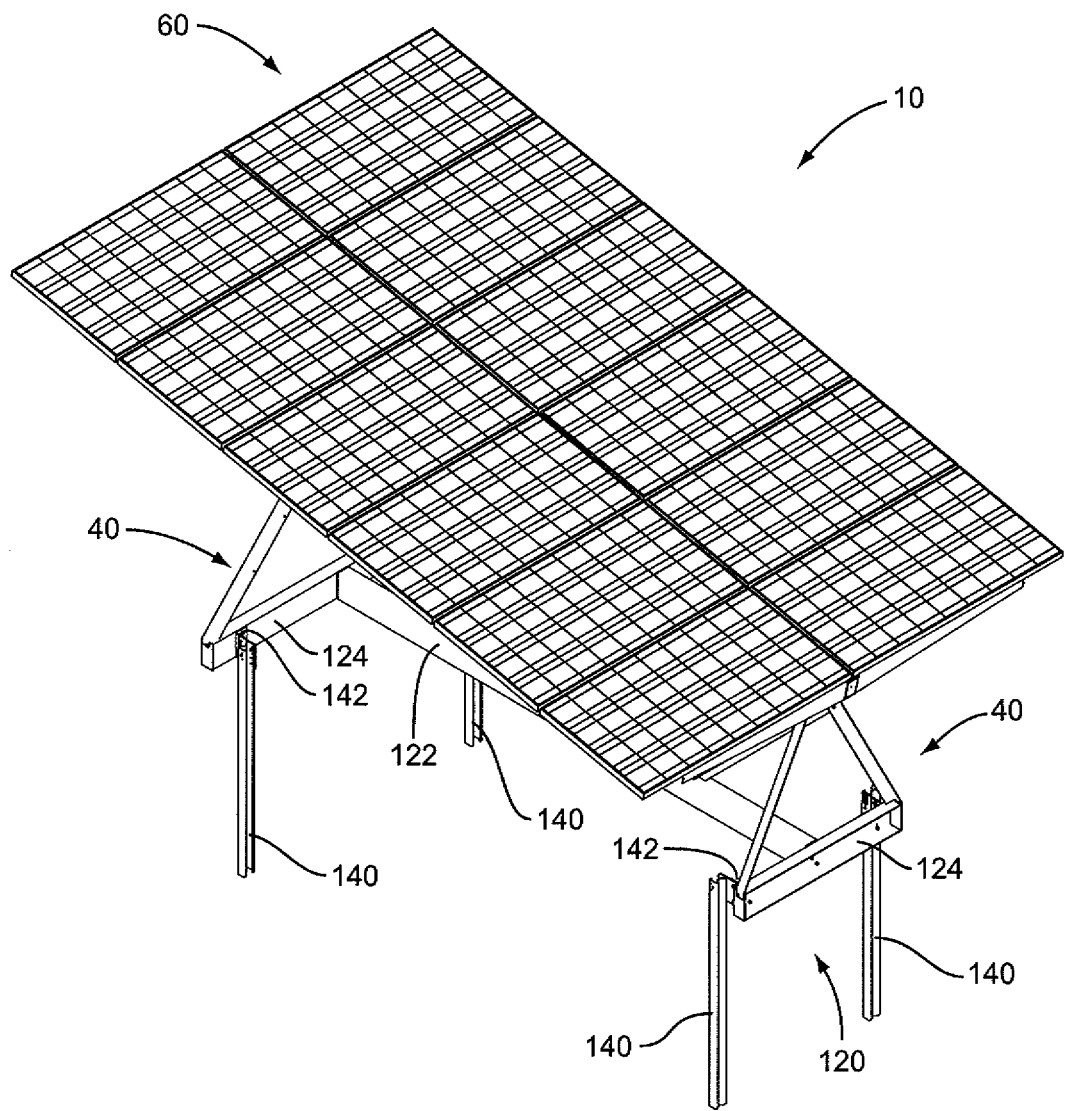
FIG. 11 illustrates a third embodiment of the solar tracker.

FIG. 11 shows a third embodiment of the solar tracker. Like, the previous embodiment the base 120 comprises an I-shaped frame having center beam 122 and a pair of end beam 124. The end beams 124 may be secured to the center beam 122 by bolting, welding, or other suitable means. In the illustrated embodiment, the center beam 122 and end beams are metal tubes. Those skilled in the art will appreciate that the center beam 122 and end beams 124 may also comprise metal channels, metal I-beams, or other structural members.

The base 120 is designed to lie on a flat surface. The base 120 is held in place by anchor members 140 that are embedded in the ground or other support surface. Anchor brackets 142 connect the anchor members to the end beams 124 of the base 120.

The present invention provides a free-standing solar tracker 10 that can be easily transported to a desired location and installed. The solar tracker assembly 10 is designed to be free-standing and does not require any foundation. The solar tracker 10 rests on the surface of the ground and is held in place by ballast material. If desired, the solar tracker assembly 10 may be placed on a concrete pad, but there is no need in most instances to fasten the solar tracker to the concrete pad. However, those skilled in the art will appreciate that tie-down straps or other securing devices could be used in conjunction with the ballast material, particularly where very high winds are expected. The base of the solar tracker assembly is designed to serve as a "suitcase" for transporting the components of the solar tracker 10. As noted previously, most of the components of the solar tracker, with the exception of the spine 66 and solar panels 72, can be packaged within the base 20 for transportation and storage.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A solar tracker comprising:
   a base forming an open pan for containing a ballast material;
   a support frame mounted to said base;
   a panel assembly comprising:
      a plurality of solar panels;
      a central spine rotatably mounted to the support frame; and
      a plurality of panel carriers extending outwardly from said spine for supporting said solar panels;
   a mounting assembly for rotatably mounting the panel assembly to the support frame, said mounting assembly comprising:
      a mounting fork pivotally connected to said support frame; and
      a slot in said mounting fork configured to receive the spine of the panel assembly; and
   an actuator assembly for rotating the panel assembly to track the movement of the sun.

2. The solar tracker of claim 1 wherein panel carriers are removably connected to the spine and are configured to fit inside said closed compartment when said base is in the storage position.

3. The solar tracker assembly of claim 1 wherein the support frame includes two spaced end frames configured to be removably connected at respective ends of the base when the base is in the deployed position.

4. The solar tracker of claim 3 wherein the support frame includes two or more frame members that can be disassembled and placed inside said compartment of said base when said base is in the storage position.

5. A solar tracker comprising:
   a support frame;
   a panel assembly rotatably mounted to the support frame for supporting one or more solar panels, said panel assembly comprising a central spine and a plurality of panel carriers extending outwardly from said spine;
   a mounting assembly for rotatably mounting the panel assembly to the support frame, the mounting assembly comprising a mounting member rotatably connected to the support frame and a slot in said mounting member configured to receive the spine of the panel assembly; and
   an actuator assembly for rotating the panel assembly to track the movement of the sun.

6. The solar tracker of claim 5 wherein the panel assembly further comprises one or more solar panels mounted to the panel carriers.

* * * * *